United States Patent [19]

Nowack et al.

[11] Patent Number: 4,503,249

[45] Date of Patent: Mar. 5, 1985

[54] HYDROGENATION CATALYSTS

[75] Inventors: Gerhard P. Nowack; Marvin M. Johnson; Donald C. Tabler, all of Bartlesville, Okla.

[73] Assignee: Phillips Petroleum Company, Bartlesville, Okla.

[21] Appl. No.: 420,780

[22] Filed: Sep. 21, 1982

Related U.S. Application Data

[60] Division of Ser. No. 289,350, Aug. 3, 1981, Pat. No. 4,394,298, which is a continuation of Ser. No. 111,053, Jan. 10, 1980, abandoned.

[51] Int. Cl.$^3$ .............................................. C07C 85/12
[52] U.S. Cl. ..................................... 564/385; 564/450; 564/452; 564/496; 564/491; 568/772; 568/799; 585/733; 585/274
[58] Field of Search ....................... 564/385, 450, 493; 585/274

[56] References Cited

U.S. PATENT DOCUMENTS 3,536,632 10/1970 Kroll ................................ 564/385 X
3,832,401 8/1974 Knifton et al. ...................... 564/385
4,003,933 1/1977 Drake .................................. 564/385

Primary Examiner—Robert V. Hines
Attorney, Agent, or Firm—Howard D. Doescher

[57] ABSTRACT

Iron (II) hexacyanocobaltate and ruthenium (III) hexacyanocobaltate have been found to be useful in the catalytic hydrogenation of organic materials.

4 Claims, No Drawings

HYDROGENATION CATALYSTS

This is a divisional application of our copending patent application, Ser. No. 289,350, filed Aug. 3, 1981 and now U.S. Pat. No. 4,394,298, which is a continuation of application Ser. No. 111,053, filed Jan. 10, 1980, and now abandoned.

BRIEF SUMMARY OF THE INVENTION

Process for hydrogenation of various compounds to produce at least one organic compound by effecting the hydrogenation in the presence of a catalyst obtained by heating to render active for the hydrogenation, a composition comprising on a suitable support, a salt selected from at least one of an alkali metal, alkaline earth metal, iron, ruthenium, and cobalt hexacyanoferrates, hexacyanocobaltates, and hexacyanoruthenates. New compounds or salts are disclosed.

DETAILED DESCRIPTION

This invention relates to hydrogenation. In one of its aspects the invention relates to hydrogenation of certain materials or compounds to produce organic compounds. In a more specific aspect the invention relates to the hydrogenation or conversion by hydrogenation of nitriles, olefins, aromatics and their derivatives, ketones, anyhdrides of carboxylic acid and carbon monoxide.

In one of its concepts the invention will provide a process for the hydrogenation of materials described or included in this disclosure by reference to them or by inference by subjecting at least one of said materials to the action of hydrogen under hydrogenation conditions in the presence of a catalyst obtained by activating a salt as herein described upon its being composited with a suitable carrier or refractory oxide also as herein described.

Still further, according to a concept of the invention, certain new salts or compounds are provided. In still another concept of the invention, there are provided the compositions comprising at least one salt as herein described on at least one suitable carrier also as herein described, said compositions being suitable upon heat activation to produce a catalyst active for the hydrogenation process of the invention.

It is an object of this invention to provide a process for the hydrogenation of certain materials to produce an organic compound. It is another object of this invention to provide compositions which upon heat activation are suitable as catalysts for hydrogenation of a material to produce an organic compound. A further object of the invention is to produce a catalyst suitable for carrying out a hydrogenation operation or process. A still further object of the invention is to provide certain new salts or compounds.

Other aspects, concepts, objects, and several advantages of the invention are apparent from a study of this disclosure and the appended claims.

According to the present invention there is provided a process for the hydrogenation of a material to produce an organic compound which comprises subjecting said material to hydrogenation conditions in presence of a catalyst obtained by heat activiation, as in the presence of hydrogen, of a composition comprising a suitable carrier on which has been deposited a salt or compound selected from at least one of an alkali metal, alkaline earth metal, iron, ruthenium, cobalt hexacyanoferrate, hexacyanocobaltate and hexacyanoruthenate.

According to the invention, also, there are provided the compositions which comprise essentially deposited on a suitable carrier, as described herein, at least one of said salts or compounds.

Still further according to the invention, there are provided as new compounds iron hexacyanocobaltate (II) and ruthenium hexacyanocobaltate (III).

The catalysts employed in the hydrogenation process of the invention are derived from salts comprising, as anions, hexacyano complexes of iron, cobalt, and ruthenium, and contain, as cations, iron, cobalt, and ruthenium, and/or elements of groups Ia and IIa of the Periodic Table of the Elements.

Included by way of specific examples of these salts are cobalt hexacyanoferrate(II) ($Co_2[Fe(CN)_6]$), potassium hexacyanocobaltate(III) ($K_3[Co(CN)_6]$), iron hexacyanocobaltate(II) ($Fe_2[Co(CN)_6]$), calcium hexacyanoferrate(II) ($Ca_2[Fe(CN)_6]$), iron hexacyanocobaltate(III) ($Fe_3[Co(CN)_6]_2$), ruthenium hexacyanocobaltate(III) ($Ru[Co(CN)_6]$, potassium hexacyanoruthenate(II) ($K_4[Ru(CN)_6]$), iron hexacyanoruthenate(II) ($Fe_2[Ru(CN)_6]$), and cobalt hexacyanoruthenate(II) ($Co_2[Ru(CN)_6]$).

Catalysts are prepared from said salts supported on refractory oxides such as activated alumina, silica gel, titania, magnesia, zirconia, zinc titanate, kieselguhr, pumice, and the like, wherein an extended surface is available to increase the effectiveness of the catalyst.

Salts containing the cyano complexes can be applied to the support by impregnation with a solution in which they are dissolved. Water is generally a suitable solvent for salts in which the cation is an alkali or alkaline earth element from Groups Ia or IIa. If the salt is relatively insoluble in available solvents it can be applied to the support by precipitating it from solutions that contain appropriate ions, i.e., a solution of the desired cations(s) and a solution of hexacyanocobalt, hexacyanoruthenium, or hexacyanoiron, by combining the solutions in the presence of the support. Neither of these solutions should contain compounds of sulfur or phosphorus because they reduce the activity of the resulting catalyst. It is preferable that they do not contain halogen compounds which are generally corrosive to process equipment. When the cyano complex is made by precipitation as described here it is not necessary, and at times it may even be undesirable, to separate the solid phase (precipitate and support) from the liquid phase by filtration.

After the cyano complex and the support have been combined, either by impregnation or by precipitation, solvent is removed by evaporation and the residual solid is usually converted to the active catalytic form by heating in an atmosphere comprising hydrogen. Some of the hydrogen may be replaced by a material or gas which produces a desired activating or inert atmosphere. It can be heated to at least 475° C. Preferably, however, the catalyst is heated to about 325°–430° C. for a time sufficient to produce an active catalyst. This may be from 0.1 to 10 hours, or even longer. Generally a time of 0.5 to 2 hours is suitable.

The chemical nature of the activated catalyst is not known; although essentially all of the nitrogen has been removed it is not known whether the accompanying carbon is also removed during activation. In addition the form of the Group Ia and IIa elements (if present) after activation is also unknown.

And, when the cyano complex is formed by precipitation, the unprecipitated ions originally associated with the reactants can affect the nature of the activated catalyst. Because of this uncertainty the concentration of catalyst on support cannot be defined in terms of compounds actually present. However, the composition that comprises the cyano complex plus the support, before activation but calculated on an anhydrous (or solvent-free) basis, should contain between about one to about 15 weight percent of iron, cobalt, and/or ruthenium, and at least one of these elements is present as the hexacyano anion in the salt of said complex.

APPLICATIONS OF HYDROGENATION CATALYSTS

Compositions prepared as described above are effective hydrogenation catalysts. Reactions exhibiting this property include (1) conversion of nitriles to imines and amines, (2) saturation of olefins, (3) complete or partial saturation of aromatic rings in hydrocarbons and also in derivatives of these compounds that contain elements in addition to carbon and hydrogen, (4) conversion of ketones to alcohols, (5) conversion of the anhydride of carboxylic acid to the free acid plus the corresponding aldehyde and alcohol, and (6) conversion of carbon monoxide to methane and higher hydrocarbons.

It is not unexpected that conditions for these reactions vary considerably, both because of inherent differences in the ease with which these classes of reactants can be hydrogenated but also because of difference between different members of a class. Conditions suitable for effecting catalytic hydrogenation are cited in the examples that are described below, following the description of the preparation of catalysts. One skilled in the art can determine by routine test the conditions optimum for the operation to be effected.

EXAMPLE 1

Catalysts from solution impregnation. Catalyst A was prepared by mixing a solution made by dissolving 1.0 g of $K_3[Co(CN)_6]$ in 10 mL of water with 10 g of Alon-C (Trademark) (flame hydrolyzed alumina, made by Cabot Corp.). The slurry was dried in an oven at 110° C.

Catalyst B was prepared by mixing a solution made by dissolving 3.5 g of $K_4[Ru(CN)_6].3$ $H_2O$ (from Alfa Division of Ventron Corp.) in 11 mL of water with 15.7 g of $-10+40$ mesh Harshaw activated alumina having a surface area of about 200 m²/g. The slurry was dried in an oven at 110° C. for 3 hours.

Catalyst C was prepared by mixing a solution made by dissolving 3.26 g of $K_4]Ru(CN)_6].3$ $H_2O$ in about 30 mL of water containing 3 drops of glacial acetic acid with 17.3 g of Cab-O-Ti (Trademark) (flame hydrolyzed titanium dioxide, made by Cabot Corp.) After stirring to form a thin, smooth paste it was dried in an oven at 110° C. for 4 hours.

Catalysts made by precipitation, then at least partial removal of dissolved salts. Catalyst D was prepared by dissolving 0.84 g (0.00214 moles) of $Fe(NH_4)_2(SO_4)_2.6$ $H_2O$ in about 50 mL of water to which 20 g of Catapal (Trademark) alumina powder, having a surface area of 268 m²/g, and 0.2 mL of glacial acetic acid had been added, then adding a solution of 0.50 g (0.00121 moles) of $K_4[Ru(CN)_6].3$ $H_2O$ in about 40 mL of water. This was filtered; the filter cake was washed by re-suspending in water and again filtering; this washing procedure was repeated two more times. Finally the filter cake was dried in an oven at 110° C. The resulting product was too soft and non-coherent to use, so it was compressed into one-inch diameter wafers at 11000 psig, then crushed and screened to obtain a $-10+40$ mesh portion.

Catalyst E was prepared by dissolving 9.4 g (0.0377 moles) of $Co(C_2H_3O_2)_2.4$ $H_2O$ and 2 mL of glacial acetic acid in about 75 mL of water and warming to effect complete dissolution. To this was added 20 g of the same kind of alumina used to make catalyst D, then a solution of 8.0 g (0.0189 moles) of $K_4[Fe(CN)_6].3$ $H_2O$ in 75 mL of water. The mixture was dried in an oven at 110° C. After drying the resulting cake was washed twice by stirring with water, then filtering. The pink color of the filtrate indicated that some cobalt had returned into solution. The water-washed cake was again dried in an oven at 110° C. for 4 hours.

Catalyst F was prepared by adding to a water slurry of 10 g of the kind of alumina used in catalyst A a solution containing 1.1 g (0.0054 moles) $FeCl_2.4$ $H_2O$, then a solution containing 1.0 g (0.0027 moles) $K_4[Co(CN)_6]$. After warming and stirring for several minutes the preparation was filtered by vacuum filtration; the resulting filter cake was dried in an oven at 110° C. for several hours.

Catalyst G was prepared in exactly the same manner as F, but comprised 0.8 g (0.041 moles) of $FeCl_2.4$ $H_2O$ and 0.9 g (0.0027 moles) of $K_3[Co(CN)_6]$, with 10 g of the same kind of alumina. After filtering the resulting filter cake was dried in an oven at 110° C. overnight.

Preparation of catalyst H began by impregnating 10 g (26 mL) of silica gel with a solution prepared by dissolving 4.7 g of $Co(C_2H_3O_2)_2.4$ $H_2O$ and 3 mL of glacial acetic acid in sufficient water to make 20 mL of solution. All but 3 mL of the solution was absorbed; it was discarded. The impregnated gel was dried in an oven at 100° C. for 2 hours; it was then treated with a solution containing 5.0 g of $K_4[Fe(CN)_6].3$ $H_2O$. During one hour an insoluble, yellow powder formed around the gel particles. The gel was washed several times to remove soluble salts and the non-adhering yellow powder. The remaining gel particles, which are green-black and translucent, were dried in an oven at 110° C. for 4 hours.

EXAMPLE III

Catalysts prepared by precipitation and drying only. Catalysts J, K, L, and M were all prepared in essentially the same manner. A solution in water of the salt that supplied the cation of the insoluble salt was first mixed with the catalyst support; to this a solution of the cyano complex was added to produce the desired precipitate. After mixing well the resulting compositions were dried in an oven. Table I summarizes the ingredients used in these four preparations.

TABLE I

| Catalyst | Ingredients | Support |
| --- | --- | --- |
| J | 1.7 g $Co(C_2H_3O_2)_2.4$ $H_2O$/50 mL, 0.7 mL $HC_2H_3O_2$<br>1.6 g $K_4[Ru(CN)_6].3$ $H_2O$/50 mL | 10 g Catapal ® $Al_2O_3$ |
| K | 9.4 g $Ni(C_2H_3O_2)_2.4$ $H_2O$/75 mL, 0.7 mL $HC_2H_3O_2$<br>8.0 g $K_4[Fe(CN)_6].3$ $H_2O$/75 mL (not an invention | 20 g Catapal ® $Al_2O_3$ |

TABLE I-continued

| Catalyst | Ingredients | Support |
|---|---|---|
| | catalyst) | |
| L | 3.4 g Co(C$_2$H$_3$O$_2$)$_2$.4 H$_2$O/50 mL, 2 mL HC$_2$H$_3$O$_2$<br>3.2 g K$_4$[Ru(CN)$_6$].3 H$_2$O/30 mL | 20 g Catapal ® Al$_2$O$_3$ |
| M | 0.45 g RuCl$_3$/50 ml,<br>1.0 g K$_3$[Co(CN)$_6$] | 20 g Catapalt 200 Al$_2$O$_3$ |

The concentration of the transition elements iron, cobalt, and ruthenium in the 12 catalysts that have been described in Examples I-III, calculated as described above, is summarized in Table II.

TABLE II

| Catalyst | Elements | Conc., Wt. % |
|---|---|---|
| A | Co | 1.5 |
| B | Ru | 3.6 |
| C | Ru | 3.1 |
| D | Fe + Ru | 1.3 |
| E | Fe + Co | 12.5 |
| F | Fe + Co | 4.2 |
| G | Fe + Co | 3.6 |
| H | Fe + Co | 12.2 |
| J | Co + Ru | 6.6 |
| K | Fe + Ni | 12.5 |
| L | Co + Ru | 6.6 |
| M | Co + Ru | 1.9 |

Before being used all of these catalysts were activated by being heated in hydrogen for 1–3 hours at about 427° C. They were used ina variety of hydrogenation reactions that are illustrated in the following examples.

EXAMPLE IV

Catalyst A, crushed to pass a 10 mesh sieve, was used to hydrogenate acetonitrile in benzene solution. A 300 mL stirred autoclave, flushed with nitrogen, was charged with 5.0 g of catalyst A, 22 mL acetonitrile and 100 mL benzene. The autoclave was pressurized to 500 psig ($3.55 \times 10^6$ Pa) with hydrogen and heating was begun. At about 188° C. and 681 psig ($4.80 \times 10^6$ Pa) the rate of hydrogenation became perceptible. The pressure was increased to about 800 psig and maintained there with incremental hydrogen additions and the reaction continued for about 5 hours at 188°–191° C. Analysis of eight samples taken from the liquid phase during the run showed the catalyst to be very active for hydrogenation of the nitrile. During the run the concentration of the intermediate product N-ethyliminoethane (CH$_3$CH=NC$_2$H$_5$) was very substantial but it was converted ultimately to amines.

EXAMPLE V

Catalyst B was used to hydrogenate carbon monoxide. There were placed into the 300 mL autoclave, that had been flushed with nitrogen, 100 mL of n-decane and 7.0 g of catalyst B. The autoclave was pressurized to 300 psig with 1:1 H$_2$:CO mixture and then to 600 psig with pure hydrogen to provide a gas mixture containing 3 H$_2$:one CO. No reaction was observed when the reactor was heated to 224° C. It was cooled, 10 mL of water was added, and the autoclave was again pressured with the same gas mixture. When heated to 224° C. a small concentration of methane was produced in the gas phase; no methanol was detected in the liquid phase.

EXAMPLE VI

Catalyst C was used to hydrogenate benzene. Into the 300 mL autocalve, that had been flushed with nitrogen, 100 g of benzene, 40 mL of water, and 5 g of catalyst C were placed. The autoclave was pressurized with hydrogen to about 700 psig. Consumption of hydrogen began at about 183° C. and attained an appreciable rate at about 194° C. Five samples from the liquid phase were collected during 75 minutes while the temperature was increased to 199° C. The system cooled overnight but heating was resumed the following day and maintained between 193°–203° C. at 800 psig for 2.5 hours; three more liquid-phase samples were taken. Analysis of the series of samples showed increasing concentration of cyclohexane with time; the concentration of cyclohexene during the run was measurable but did not exceed one percent in any of the samples.

EXAMPLE VII

Catalyst D was also used to hydrogenate benzene. Into the 300 mL autoclave, that had been flushed with nitrogen, 100 g of benzene, 35 mL of water, and 4.5 g of catalyst D were placed. The autoclave was pressurized with hydrogen and heated to about 204° C. at 890 psig for nearly an hour. The rate of hydrogen consumption was low; at the end of the run about 0.1% of the benzene had been hydrogenated to cyclohexane.

EXAMPLE VIII

Catalyst E was used to hydrogenate acetonitrile. Into the 300 mL autoclave, that had been flushed with nitrogen, 100 mL of benzene, 22 ML of acetonitrile, and 5g of catalyst E were placed. The autoclave was pressurized with hydrogen to 800 psig and heating was started. Hydrogen consumption became perceptible at about 65° C. Heating continued and the autoclave was maintained between about 138°–143° C. during 4.5 hours while the pressure ranged between about 600 to 800 psig (hydrogen was added batchwise during the run). At the completion of hydrogenation, GLC analysis of the product showed the mole ratio of ethylamine to diethylamine to be 16.

EXAMPLE IX

Catalyst F was used to hydrogenate acetonitrile. Into the 300 mL autoclave, that had been flushed with nitrogen, 100 mL of benzene, 22 mL of acetonitrile, and 4.3 g of catalyst F were placed. The autoclave was pressurized with hydrogen and heating was started. Hydrogen consumption became perceptible at about 170° C. Heating continued to about 178° C., and the temperature was gradually raised to about 201° C. at 800 psig during the 5.5 hrs. that the run continued. Ten samples from the liquid phase in the autoclave were collected during this run. After cooling the reactor overnight the run was continued for another seven hours at 200°–202° C. and 800 psig. Samples from the first segment of the run indicated that the concentrations of ethylamine and N-ethyliminoethane were about equal. However, after hydrogenation had been completed the molar ratio of ethylamine:diethylamine was about 50. Possibly some of the imine reverted to ethylamine; also, the final material contained 5.0 wt. % heavies based on the original nitrile indicating that some oligomerization had occurred.

EXAMPLE X

Catalyst G was used to hydrogenate acetonitrile in a run very similar to Example IX. The autoclave was charged with 100 mL benzene, 22 mL acetonitrile, and 4.8 g catalyst G. Hydrogen consumption became perceptible at about 154° C. at 680 psig hydrogen pressure. The temperature was increased further and maintained between about 178°–184° C. and 800 psig for 4.5 hrs. After cooling overnight the hydrogenation was completed in another period of about 4 hrs. at 184°–185° C. and 800 psig. This catalyst was less selective to make ethylamine than catalyst F in example IX was: the ethylamine:diethylamine mole ratio in the product was 25.

EXAMPLE XI

Catalyst H was used to hydrogenate acetonitrile in a run very similar to Example IX. The autoclave was charged with 100 mL benzene, 22 mL acetonitrile, and 4.8 g of catalyst H. Hydrogen consumption became perceptible at about 153° C. at 1120 psig. Heating continued, and the temperature was maintained between 205°–207° C. at 800 psig for 2.5 hours, at which time hydrogenation of the nitrile, as shown by hydrogen consumption, was complete. GLC analysis of the product showed 80–90% ethylamine, 10–15% diethylamine, a trace of N-ethyliminoethane, and three unidentified components. Triethylamine and cyclohexane were absent from the product.

EXAMPLE XII

Catalyst J was used to catalyze the hydrogenation of seven different compositions which are described separately here. All of the runs were made in a 300 mL stirred autoclave.

1. The autoclave was charged with 100 mL benzene, 22 mL acetonitrile, and 5 g of catalyst J. It was heated after being pressurized with hydrogen to 800 psig. Consumption of hydrogen became perceptible at about 60° C. Heating continued, and the temperature was maintained between 119°–122° C. at about 800 psig for 2.6 hours. Analysis of a sample taken from the liquid phase near the end of the run showed that the molar ratio of ethylamine:diethylamine in the product was 16.

2. The autoclave was charged with 100 mL toluene, 43 mL benzonitrile, and 6.1 g of catalyst J. The reactor was pressurized with hydrogen to 800 psig and heating was started. Hydrogen consumption became perceptible at about 82° C. and 900 psig. Heating continued an additional 0.7 hours, to 117°, then the reactor was allowed to cool overnight. Upon resumption of operation the following day the autoclave was heated and maintained at 116°–124° C. for 7.5 hours at about 1000 psig. Fourteen samples were taken from the liquid phase during this period. Operation again was shut down overnight and the final period of hydrogenation resumed the next working day, consisting of 4.5 hours at 128°–136° C. at about 1000 psig. Six samples were taken during this interval. GLC analyses of these samples showed that benzylamine and N-benzylbenzaldimine (PhCH=NCH$_2$Ph) apparently are the initial reaction products. Further hydrogenation converts the latter compound to dibenzylamine, then to benzyl(cyclohexylmethyl)amine (C$_6$H$_{11}$CH$_2$NHCH$_2$Ph), and finally to di(cyclohexylmethyl)amine. Similarly the benzylamine is converted to (cyclohexylmethyl)amine. At the end of this run virtually all of the benzonitrile had been converted to these two saturated amines.

3. The portion of catalyst J that had been used in the run described in paragraph 2, after being separated from the liquid by filtration, was washed with tert-butanol and returned to autoclave, care being taken to avoid contact with atmospheric oxygen. To it was added 16.2 g of 4-methyl-1,7-dicyanohept-3-ene in about 120 mL of tert-butanol. Hydrogenation began at 110° C.; the first day's operation was at 121°–125° C. for 6.5 hours at about 800 psig. Six samples were collected during that period. In the next day of operation the pressure was reduced to 520 psig but the temperature was increased to 171° C. for several hours of operation. After an overnight shutdown these condition were again used for a third interval. Samples were taken at the end of each of these last two periods, for GLC analysis. These showed that the two nitrile groups were readily reduced at the milder conditions initially used, but the olefinic unsaturation was removed at a reasonable rate only at the higher temperature employed. No evidence for heavier compounds was found in the final hydrogenation product when analyzed on either a Carbowax (Trademark) K2OM or a UC W 98 GLC column.

4. The portion of catalyst J that had been used in the run described in paragraph 1 above, after being separated from the liquid by filtration, was washed with methylcyclohexane and returned to the cleaned, flushed autoclave with 19g phenol and about 100 mL of methylcyclohexane. The autoclave was pressurized with 500 psig hydrogen. Hydrogenation of the phenol was effected for 3.5 hours at 108°–109° C. at about 800 psig; then, after overnight shutdown was continued for several hours at up to 140° C. and 800 psig, the phenol was converted to cyclohexanol containing a trace of cyclohexanone by this treatment.

5. To the portion of catalyst J that had been used in the run described in paragraph 4 was added 10 mL (0.138 moles) of acetone. The autoclave was pressurized with hydrogen to 500 psig at 21° C. During one hour the temperature was raised to 125° C., while pressure decreased to 322—equivalent to consumption of 0.138 moles of hydrogen. GLC analysis of the product from this run showed only isopropanol, demonstrating that catalyst J is very active for hydrogenation of carbonyls.

6. The portion of catalyst J that had been used in the run described in paragraph 5 was separated from its reaction product, washed with benzene, and returned to the cleaned autoclave together with 100 mL benzene and 20 g naphthalene. (This was the fourth run with this portion of catalyst J). The autoclave was pressurized with hydrogen to 500 psig. Although reaction was already perceptible at 25° C. the autoclave was warmed and maintained at 102°–104° C. for 4 hours at about 800 psig. Its temperature was increased to 156°–162° C. for another hour at the same pressure. Seven samples from the liquid phase were collected during the lower temperature interval and five more at the higher temperature. GLC analyses showed that the reaction at the lower temperature was very selective to produce tetralin. At complete naphthalene conversion there were only traces of octalins and decalin and, despite an 8:1 mole ratio of benzene to naphthalene, only 10% of the benzene had been converted to cyclohexane. At the higher temperature, and with all the naphthalene hydrogenated, benzene was rapidly saturated to cyclohexane. The rate of hydrogen consumption then slowed greatly as the tetralin was hydrogenated to decalin, having a cis/trans ratio of about two, and small concentrations of octalins.

7. The portion of catalyst J that had been used in the run described in paragraph 6 was separated from the reaction products by filtration, washed with cyclohexane, and returned to the cleaned autoclave with 25 mL of acetic anhydride and 100 mL of cyclohexane. The autoclave was pressurized with hydrogen to 500 psig and then heated to 205° C. Hydrogen was consumed at a very slow rate; a trace of ethyl acetate was produced. The mixture was then heated to 250° C. for 6 hours at about 800 psig. The major product from this interval of the run was acetic acid, with smaller concentrations of ethanol, acetaldehyde, and ethylacetate.

EXAMPLE XIII

Catalyst K was used in an attempt to hydrogenate acetonitrile. Into the 300 mL autoclave that had been flushed with nitrogen 100 mL of benzene, 22 mL of acetonitrile, and 5 g of catalyst K were placed. The autoclave was pressurized with hydrogen to 800 psig and heating was started. During 5.5 hrs. the temperature was increased from 25° to 188° C. while the pressure increased to 1290 psig. There was no evidence for hydrogen consumption during the run, and GLC analysis of the reaction product at the conclusion of the run also showed no conversion. This catalyst, which is not a composition of this invention, was completely inactive under these conditions.

EXAMPLE XIV

Catalyst L was used in two runs to catalyze the hydrogenation of carbon monoxide and in one run to hydrogenate benzene. All runs were made in a 300 mL autoclave. (Catalyst L is essentially identical with catalyst J, but was prepared as a separate batch.)

1. Into the clean, nitrogen-flushed autoclave was placed 5.5 g of catalyst L that had been used in another run after being activated. The autoclave was pressurized with 1:1 $H_2$:CO gas to 300 psig, then with pure hydrogen to 600 psig, producing a gas mixture having the approximate molar composition 75% $H_2$:25% carbon monoxide. As the autoclave was warmed there was no evidence of hydrogen consumption until the temperature reached 215° C. The autoclave was held at 227° C. for an hour, then cooled. GLC analysis of the gaseous reaction product showed, on a volumetric basis: 38.55% $H_2$, 3.74% CO, 6.55% $CO_2$, 49.03% $CH_4$, 0.46% $C_2H_6$, 0.20% $C_3H_8$, and 0.03% $C_4H_{10}$.

2. In this run the autoclave was charged with 100 mL of n-decane and 8.4 g of catalyst L that had been previously used in another run. After flushing with nitrogen the autoclave was pressurized to 600 psig with 75% $H_2$:25% CO as in the preceding run. While the autoclave was being warmed consumption of hydrogen became perceptible at 210° C. The temperature was increased to 228° C. and was held there while the pressure fell to, and remained constant at, 200 psig. Analysis of the gaseous reactant product from the cooled reactor showed, on a volumetric basis: 11.55% $H_2$, 2.10% CO, 1.59% $CO_2$, 79.47% $CH_4$, 2.63% $C_2H_6$, 0.88% $C_3H_8$, and 0.16% $C_4H_{10}$.

3. About 1.5 g of activated catalyst L that had not been previously used was placed in an autoclave with 45 mL of water and 150 g of benzene. After flushing out air the autoclave was pressurized to 400 psig with hydrogen. When the stirrer was started at about 21° C. hydrogenation began at an appreciable rate and within one hour the pressure in the autoclave was less than atmospheric. Analysis of the organic phase from the reactor showed, in addition to benzene, cyclohexane plus a trace of cyclohexene. The autoclave was then heated to about 143° C., pressurized with hydrogen to about 800 psig, and samples were taken every few minutes as the rate of hydrogen consumption was rapid. In these samples the maximum observed concentration of cyclohexene was 14%, at 52% benzene conversion. The run was not taken to complete saturation since production of cyclohexene was the principal objective. It was observed that the catalyst, after cooling, had become deactivated and was no longer effective at ambient temperature.

EXAMPLE XV

Catalyst M was used in runs to hydrogenate benzene and bis(4-aminophenyl)methane. Both runs were made in a 300 mL stirred autoclave.

1. In an autoclave 40 mL of water, 100 g of benzene, and 5.0 g of catalyst M were placed. It was pressurized with hydrogen to 500 psig at ambient temperature. In 15 minutes about 60% of the hydrogen had been consumed; the ratio of cyclohexane:cyclohexene that had been made was 28:1. Remaining hydrogen was vented from the reactor, it was heated to 138° C., and the autoclave was repressurized to about 800 psig which was maintained during 35 minutes while seven samples were taken. Table III summarizes reactor temperatures and the results of GLC analyses of the hydrocarbon phase.

TABLE III

| Sample | Elapsed Time, Min. | Temp., °C. | Concentration, Mole % | | |
|---|---|---|---|---|---|
| | | | Cyclohexane | Cyclohexene | Benzene |
| B | 0 | 138 | 4.3 | 0.2 | 95.5 |
| C | 5 | 179 | 13.0 | 3.0 | 84.0 |
| D | 8 | 188 | 19.9 | 5.0 | 75.0 |
| E | 13 | 192 | 27.6 | 5.5 | 66.7 |
| F | 20 | 193 | 38.5 | 6.5 | 54.8 |
| G | 28 | 184 | 46.1 | 6.2 | 47.2 |
| H* | 35 | 188 | 62.0 | 7.6 | 29.8 |

*Also contained 2.5% of <$C_6$ hydrocarbons, from cracking.

Because catalyst M showed exceptionally high activity in this run 20 g (0.10 mole) of bis(4-aminophenyl)methane was added to the autoclave after it had cooled, and hydrogenation was then continued while the temperature was raised to 199° C. at 462 psig hydrogen pressure. No additional hydrogenation occurred; the presence of nitrogen in this environment had poisoned catalyst M.

2. Into the purged autoclave 100 g of cyclohexane, 10 g of bis(4-aminophenyl)methane, and 2.0 g of catalyst M were placed. It was pressurized to 500 psig with hydrogen and heating was started. Consumption of hydrogen was perceptible at about 138° C. Heating continued and the autoclave was maintained for 4.5 hours at 190°–191° C. at about 800 psig. In this time hydrogenation of the amine was essentially complete; in the absence of water catalyst M maintained its hydrogenation activity. The isomer distribution of the saturated diamine was determined to be 8.7% cis-cis, 44.2% cis-trans, and 47.1% trans-trans.

Reasonable variation and modification are possible with the scope of the foregoing disclosure and the appended claims to the invention the essence of which is that there has been provided a process for the hydrogenation of materials such as have been described herein employing as catalysts a composition which has been heat activated as in an atmosphere comprising hydrogen to render it active for hydrogenation the composition comprising upon a suitable support at least one salt as herein described; that the compositions as described have been set forth and that new compounds as described have been set forth.

From examples 4, 9, 11, and 12 (2) it is evident that with the catalysts of these examples the results, especially yields of the imines, are respectably high.

It appears, then, that with the catalysts herein described more especially those in the just-mentioned examples, there have been obtained a series of results which were unexpected. Accordingly, the claims have been written to reflect these unobvious results. Indeed, the imines are recognized to be transient compounds. That the high percentage composition of these compounds would be obtained, it can be seen in view of the data, was unexpected.

We claim:

1. A process for hydrogenating organic materials comprising contacting them with hydrogen under suitable conditions in the presence of a catalyst comprising at least one metal salt selected from the group consisting of iron (II) hexacyanocobaltate, and ruthenium (II) hexacyanocobaltate.

2. The process of claim 1 wherein the catalyst contains iron (II) hexacyanocobaltate.

3. The process of claim 1 wherein the catalyst contains ruthenium (III) hexacyanocobaltate.

4. The process of claim 1 wherein the organic material is selected from the group consisting of nitriles, olefins, aromatic compounds, ketones, carboxylic anhydrides, carbon monoxide, and mixtures thereof.

* * * * *